Nov. 26, 1940.　　　E. B. MALLORY　　　2,223,257
SEWAGE TREATING APPARATUS
Filed March 1, 1937　　　5 Sheets-Sheet 1
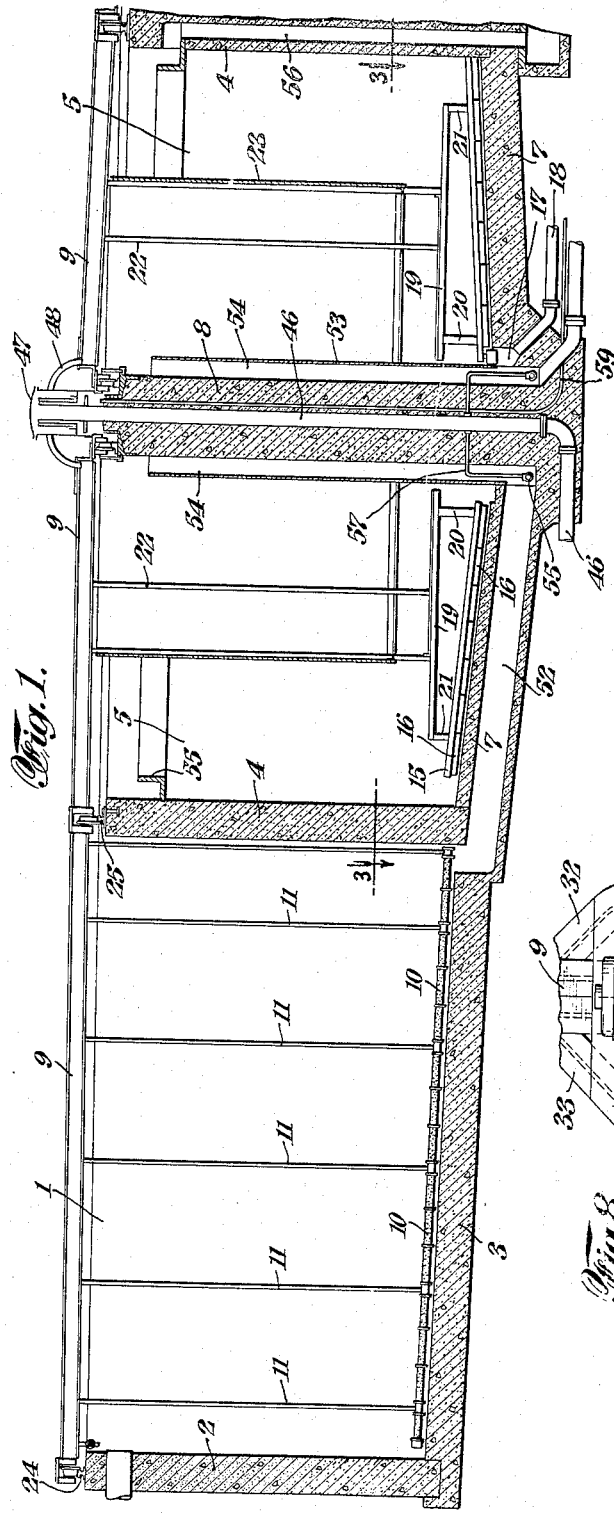
INVENTOR
Edward B. Mallory
BY
Ward Crosby & Neal
ATTORNEYS

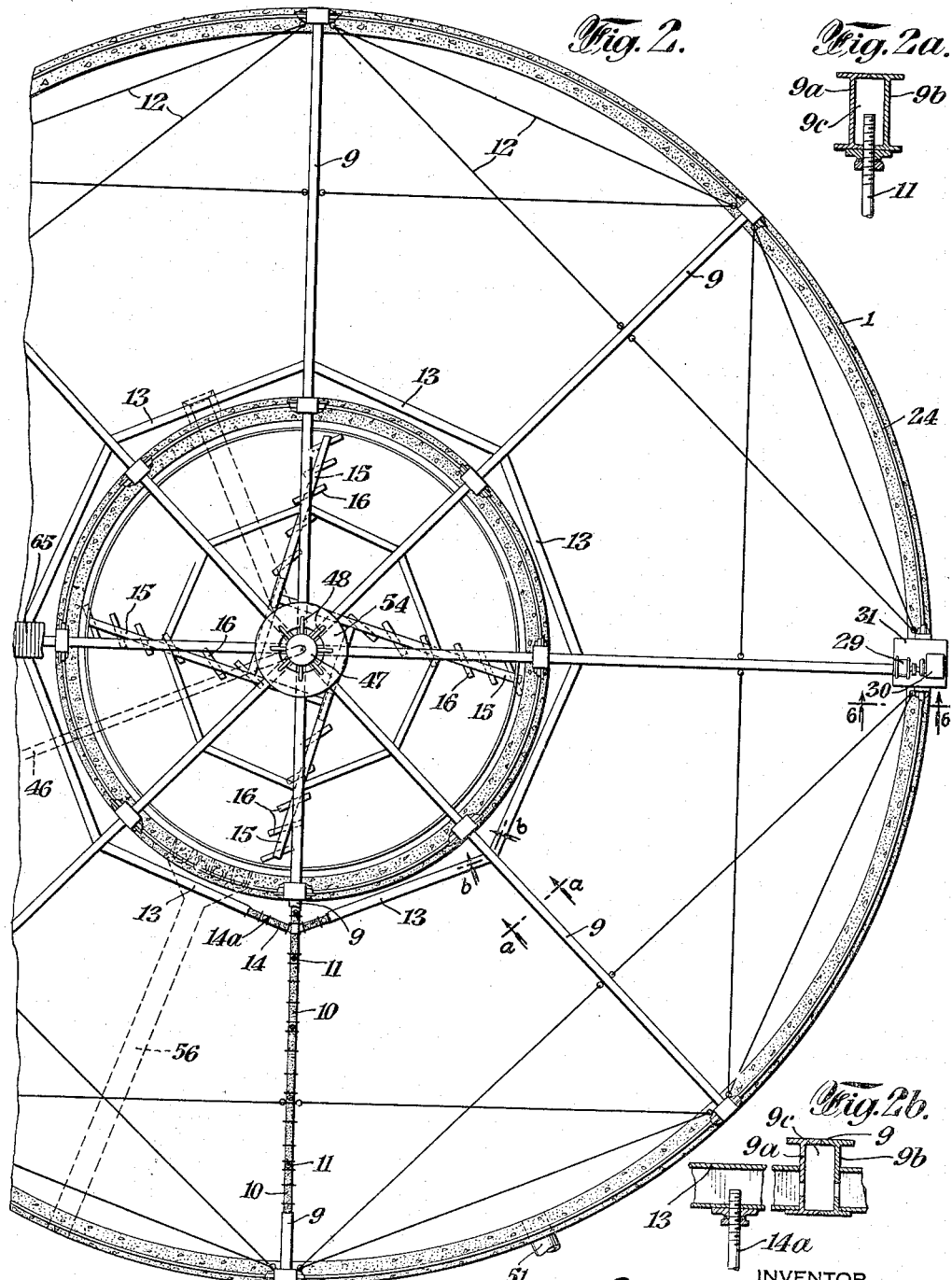

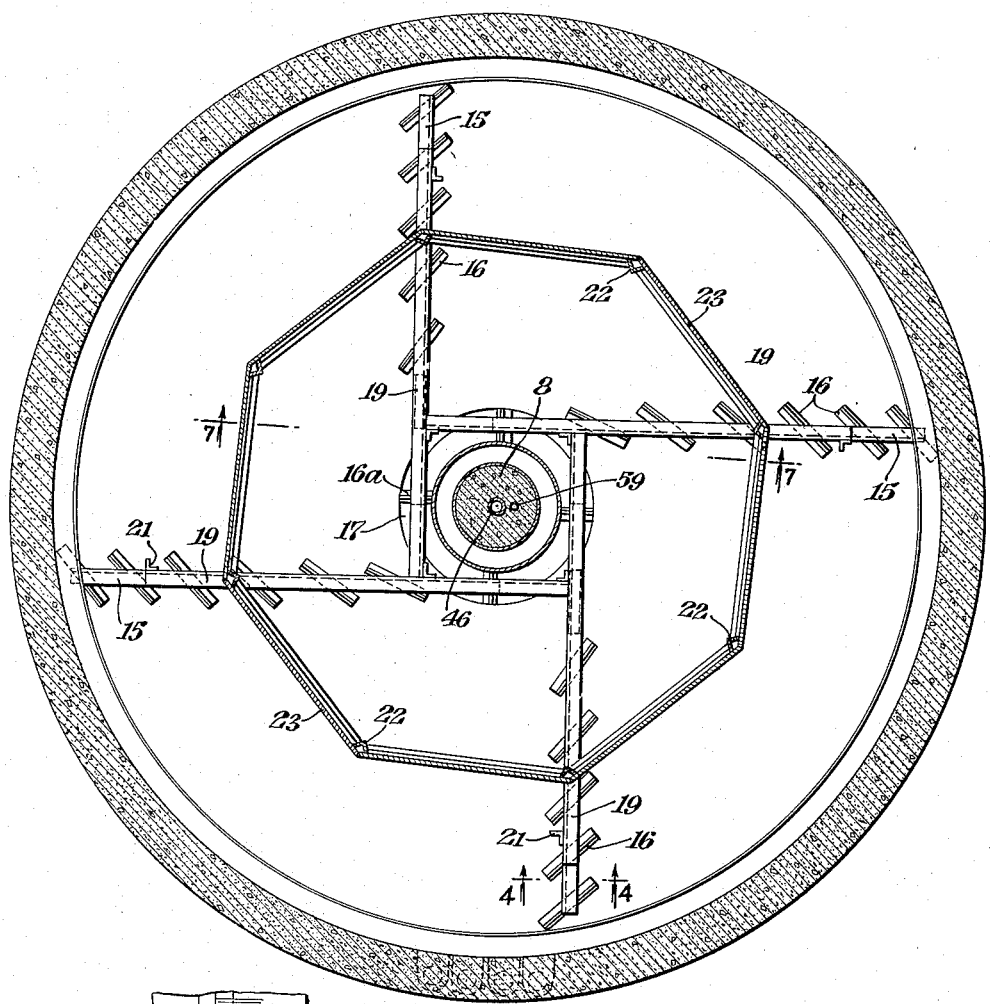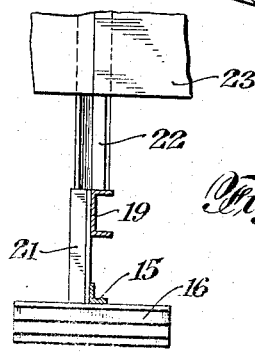

Nov. 26, 1940.  E. B. MALLORY  2,223,257
SEWAGE TREATING APPARATUS
Filed March 1, 1937   5 Sheets-Sheet 4
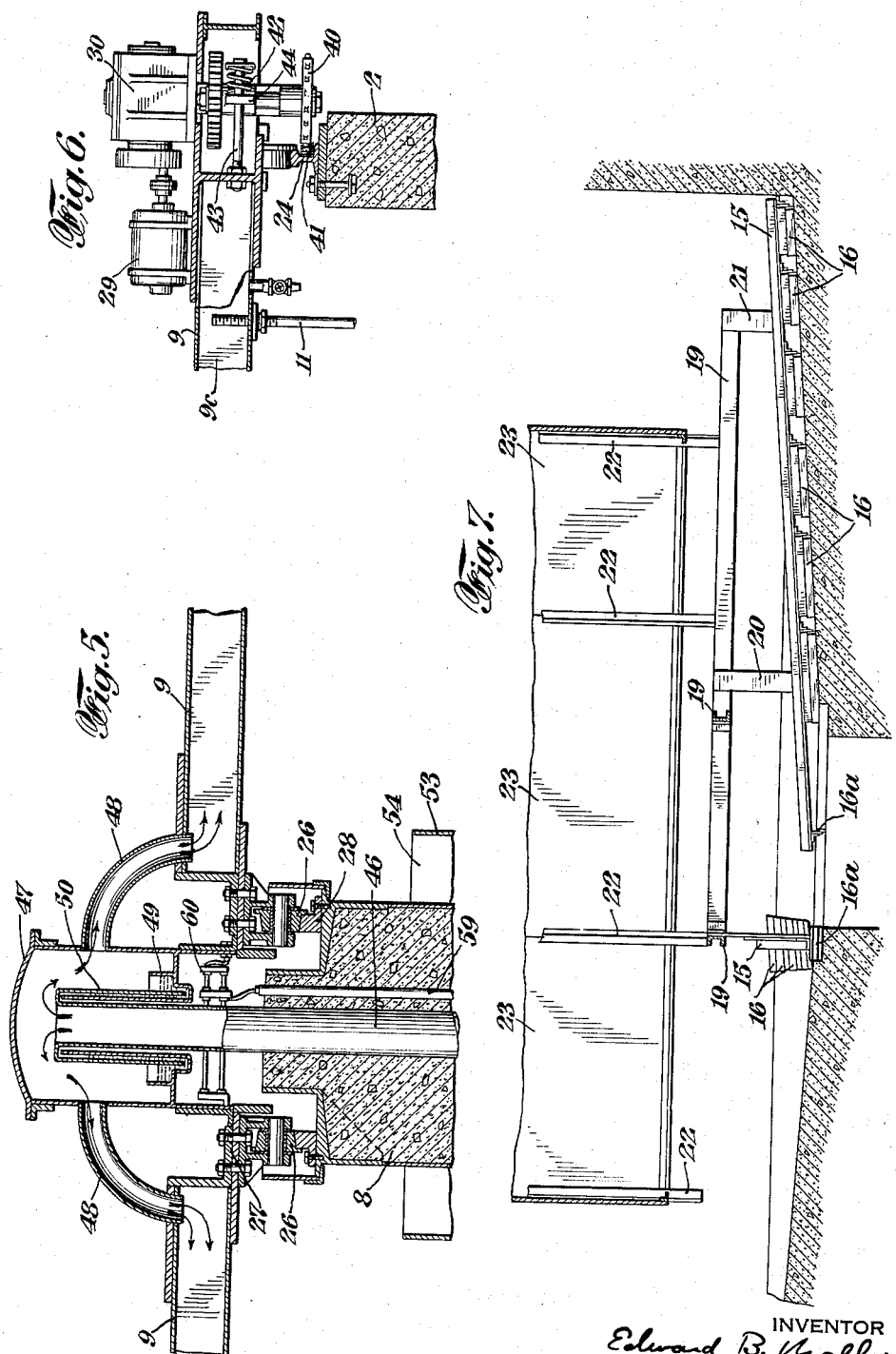
INVENTOR
Edward B. Mallory
BY
Ward Crosby Neal
ATTORNEYS

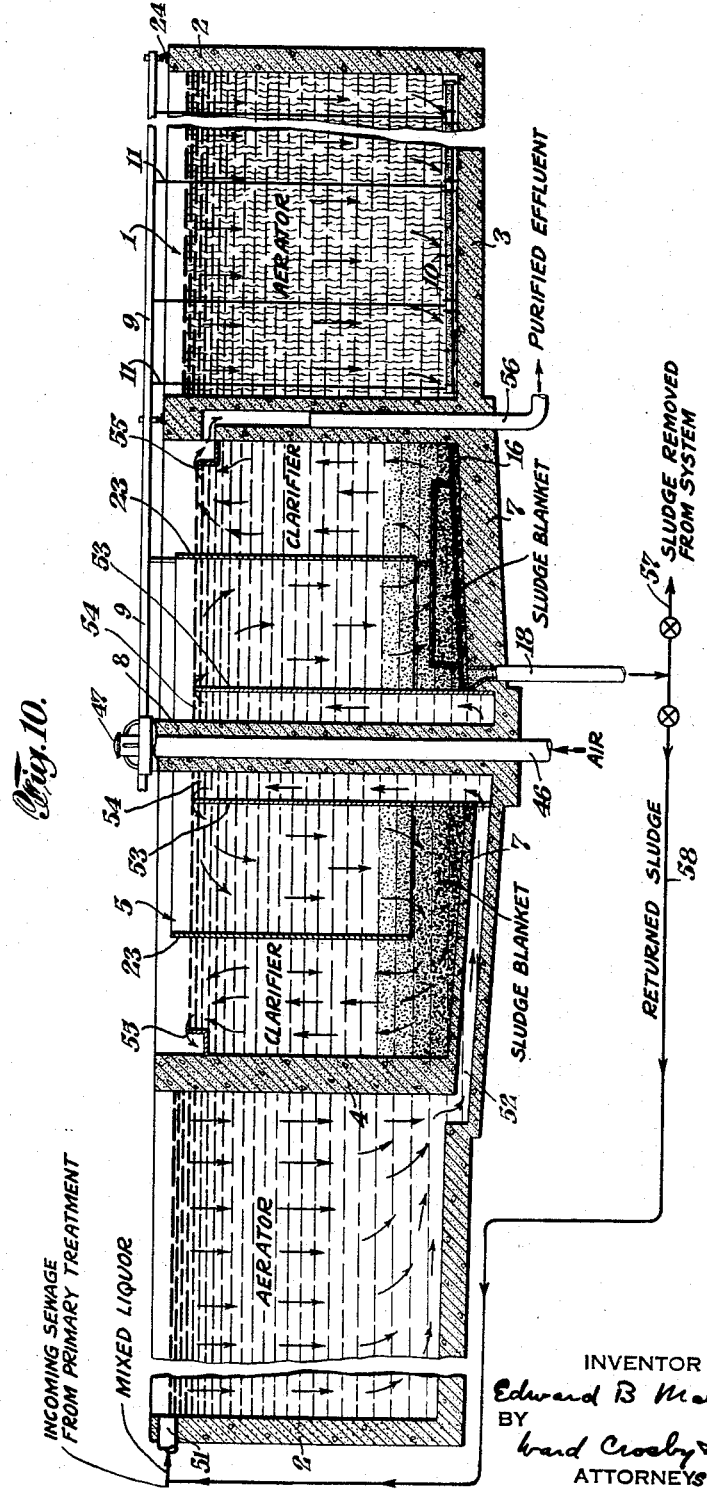

Patented Nov. 26, 1940

2,223,257

UNITED STATES PATENT OFFICE 2,223,257

SEWAGE TREATING APPARATUS

Edward B. Mallory, Tenafly, N. J.

Application March 1, 1937, Serial No. 128,317

9 Claims. (Cl. 210—8)

This invention relates to apparatus such as may be used in carrying out sewage purification processes wherein (after suitable so-called primary treatment) the incoming sewage is mixed with a certain amount of sludge returned from a clarifier tank as hereinafter referred to; the mixed liquor thus formed is subjected to oxidation in an aerator tank; and the aerated mixed liquor is then conducted to a so-called clarifier or settling tank wherein additional chemical reactions including oxidation occur and the sludge particles settle out to form a sludge blanket in the lower portion of the tank, and the purified effluent passes off from the top, a certain amount of sludge being returned from the clarifier for admixture with incoming sewage to form mixed liquor as above referred to. In some instances chemicals may be added during the cycle.

In certain of its aspects the invention relates to apparatus of the above character wherein the aerator and clarifier tanks are much more efficiently related to and combined with each other in respect to ground area required, initial cost and operating expense, and wherein a path of travel is provided for the sewage in flowing through the apparatus which is more efficient in respect to the completeness and uniformity of treatment, and reduces the hydraulic head losses entailed in passing the sewage through the cycle. In other aspects the invention aims to reduce the amount and expense of the driving mechanism employed for moving parts used in connection with tanks of the above character, and provide in an effective and simple manner for the bearings and structural supports and bracings which are needed for such moving parts. Certain of the features of the invention are useful in aerators and clarifiers per se even though differently related to each other than described hereinafter, although in its complete form the invention preferably utilizes all of said features in conjunction.

Further objects and advantages of the invention will be in part obvious and in part specifically referred to in the description hereinafter contained which, taken in conjunction with the accompanying drawings, discloses a preferred embodiment of the invention; such embodiment, however, should be considered only as illustrative of the features and principles of the invention in its broader aspect. In the drawings—

Fig. 1 is a central vertical section partly cut away of an apparatus constructed to operate in accordance with the invention.

Fig. 2 is a general plan view partly cut away of the apparatus shown in Fig. 1.

Figs. 2a and 2b are detail sections taken respectively on the lines a—a and b—b of Fig. 2, looking in the direction of the arrows.

Fig. 3 is a horizontal section through the central portion of the apparatus taken on the line 3—3 of Fig. 1 and looking in the direction of the arrows.

Fig. 4 is a detail section taken on line 4—4 of Fig. 3 looking in the direction of the arrows.

Fig. 5 is an enlarged vertical secton of the upper central part of the apparatus.

Fig. 6 is a detail view taken on the line 6—6 of Fig. 2 looking in the direction of the arrows.

Fig. 7 is a vertical section taken on the line 7—7 of Fig. 3.

Fig. 8 is a top plan view, and

Fig. 9 an end view of the parts of the apparatus which appear in Fig. 6.

Fig. 10 is a central vertical section illustrating diagrammatically the path of flow of the sewage through the apparatus.

It is frequently desired, in both aerators and clarifiers as above described, to provide operating members which move through the sewage under treatment. These operating members so used in aerators may be for the purpose of supplying and distributing air to the various zones therein, or for agitating the mixed liquor, or both; and in respect to the clarifier these moving operating members may be for the purpose of moving the sludge to be withdrawn toward its point of egress from the clarifier.

In accordance with one aspect of the invention I provide an aerator tank which is approximately annular in shape, and which encloses a clarifier tank located substantially centrally therewithin. A movably mounted supporting structure is positioned above the apparatus so as to overlie both the clarifier and the aerator, and is employed to carry both the moving operating members used in connection with the aerator and those used in connection with the clarifier, thus providing a common support for the above mentioned moving operating members, through the medium of which they may be driven from a common point or points.

The partition walls of the tanks, preferably in conjunction with a central supporting pillar extending upwardly from the bottom of the clarifier as hereinafter described in greater detail, may be utilized to afford adequate bearings and supports for the above mentioned radiating arms and the moving parts carried thereby.

In the specific form of apparatus shown in the drawings, an annular aerating tank 1 is constituted by a circular or approximately circular outer side wall 2, the bottom floor 3, and an inner side wall 4 which is substantially concentric with the outer wall 2. The clarifier tank 5 is provided with an outer side wall which may be wholly or in part constituted by the inner wall 4 of the aerator, and with a floor 7 which in the illustrated form of the invention slopes downwardly toward the center of the apparatus. And in the illustrated form of the invention a central pillar 8 extends from the bottom of the clarifier tank and may be used to perform one or more of the functions hereinafter referred to in connection with it. The above mentioned elements of the apparatus will usually be constructed of steel or concrete, or combinations thereof.

The upper supporting structure previously referred to is shown as constituted by a suitable number of arms 9 which radiate outwardly from a central point above the pillar 8, so as to overlie both the aerator 1 and clarifier 5 in such manner that a plurality of porous or perforated air diffusing members 10, located in the lower portion of the aerator, may be hung from the arms 9 by means of downwardly extending suspension members 11. The radiating arms 9 may be suitably connected together and braced as by means of the tie-rods or cables 12 (Fig. 2) which extend between them, as well as struts 13 which act as braces between adjacent arms. Generally speaking the air diffusion members 10 underlie the radiating arms 9, being directed approximately radially of the aerator, and there may also be provided further air diffusion members 14 which underlie the struts 13, and act as braces in the air diffusing structure, as well as to supply a relatively increased amount of air to the inner peripheral zone of the aerator. The upper supporting structure 9 is rotatably mounted and provided with driving mechanism, preferably as hereinafter described, so as to sweep the air diffusing members 10 and 14 slowly through the bottom portion of the aerator and promote the uniform and complete distribution of the air throughout the aerator.

There is also provided in the bottom of the clarifier 5 a suitable sludge collecting mechanism which is shown as having a plurality of scraper arms 15 carrying instroking inclined scraper blades 16, these scraper arms 15 being suitably connected and braced, and suspended from the upper rotary supporting structure above described in such manner that when the latter is rotated the sludge scraping mechanism slowly sweeps along through the bottom of the clarifier and gradually pushes the sludge radially inward along the bottom wall of the clarifier to a sump 17 (Fig. 1) from which the sludge may be drawn off through outlet conduit 18.

As shown most clearly in Figs. 3 and 7, the sludge scraper arms 15 may be suspended from the radiating arms 9 through intermediate connecting and bracing members such as the horizontal beams 19, located respectively above scraper arms 15 and connected thereto by the short angle pieces 20 and 21 (Fig. 7), the inner end portions of the beams 19 being joined together so as to surround the central pillar 8, as shown in Fig. 3. These inner portions may also carry supplementary scraper blades 16a operating in the sump 17, as shown in Fig. 3. The structure constituted by the beams 19 above described may be suspended from the radiating arms 9 by means of angle shaped uprights 22 (Figs. 3 and 7) connected to the beams 19 at their lower ends and respectively to the radiating arms 9 at their upper ends. Thus the uprights 22 in conjunction with the horizontal beams 19 make up a relatively strong and well braced (although light weight) structure through which rotary motion may be imparted to the scraper blades 16 and 16a.

I also prefer to provide an annular curtain wall 23 which projects down into the clarifier 5 and surrounds the central portion thereof so as to divide the clarifier into inner and outer compartments communicating at the bottom of the clarifier. In a construction of the character above described this curtain wall may be readily provided by fastening steel plates to the uprights 22, these plates in the illustrated form of the invention extending down nearly to the level of the horizontal beams 19 (Fig. 7). It should be understood that the word "annular" where it appears in this specification, is used in a broad or loose sense to include shapes which approach circular form, although they may be polygonal, as is the shape of the illustrated curtain wall 23. The function of this curtain wall is described more in detail hereinafter; for the present it may be noted that it rotates with the upper supporting structure constituted by the radiating arms 9, and affords additional bracing for the sludge scraping mechanism above described.

The structure constituted by the radiating arms 9 and parts suspended therefrom is rotatably mounted upon circular tracks 24 on the outer wall 2, similar tracks 25 (Fig. 1) being preferably provided on the partition wall 4 between the aerator and clarifier, as well as a central bearing above the supporting pillar 8, which latter is illustrated more in detail in Fig. 5. As there shown rollers 26 suitably journaled in a frame-work 27 at the inner ends of the arms 9, run upon a stationary circular race-way 28 which is carried by pillar 8. This bearing takes up any radial thrust.

The structure above referred to preferably is rotated as a whole by a power unit 29, which may be an electric motor and which with its attendant gearing is shown more in detail in Figs. 6, 8 and 9. As there shown power from the motor 29 is delivered to a speed reduction gearing 30 which is not illustrated nor described in detail since mechanisms suitable for the purpose are known in the art. As shown in Figs. 8 the motor and reduction gearing may be mounted upon a table 31 supported by forked beams 32 and 33 which extend out from the end of arm 9, and the power may be regarded as delivered from the speed reducing gearing 30 to a shaft 34 (Fig. 9) which extends downwardly through table 31. As a specific feature of the invention it is preferable to articulate the power transmitting gearing with respect to the stationary rail 24 in order that departures from circular curvature may not interfere with the proper driving of the rotary parts. In the illustrated embodiment of the invention the shaft 34 is journaled in a stationary bracket 35 (Fig. 9) and a frame 36 carrying a gear 37 is pivotally mounted upon shaft 34 in such manner that the gear 37 meshes with a gear 38 carried by shaft 34 (Fig. 9). The gear 37 in turn transmits the power to a spindle 39 which carries a sprocket wheel 40, which latter engages with stationary teeth associated with the stationary rail 24. As a specific feature of the invention I prefer to provide a flexible endless chain 41 to engage with the sprocket wheel 40. This flexible chain 41 may be readily wrapped around the stationary rail 24 to conform to the latter and may be easily shimmed and chocked to adjust its curvature or its peripheral length to make the links come out even. By reason of the large size of the tank and the consequent long extended frictional engagement of the chain with the rail, as well as its weight, the chain will not shift peripherally with respect to the rail or tank, but remain stationary while the sprocket 40 travels around it in a planetary manner. This specific feature of construction markedly reduces the first cost as well as the cost of installation of this part of the apparatus. The transmitting gearing is yieldably urged to hold the sprocket wheel 40 in engagement with the links of chain 41; as shown this is done by a spring 42 (Fig. 6) carried by a stationary rod 43, and which bears against a lug 44 on the pivoted frame 36 above mentioned. Thus the sprocket 40 stays in driving relation to the chain 41 even though the curvature of the latter may deviate from circular. Fig. 9 also shows rollers 45 journalled with respect to the table 31 and running on track 24, for rotatably supporting the outer end of the corresponding radiating arm 9. It will be understood that the outer ends of the other arms 9 may be similarly provided with rollers, or with a driving motor if desired.

According to one aspect of the invention I prefer to supply air to the diffusing members above mentioned through an air supply conduit 46 which passes up through the central supporting pillar 8 and is connected to the upper rotating structure through a rotary joint above pillar 8. As shown more in detail in Fig. 5, the pipe 46 may be enclosed at its upper end by a header 47 provided with branch pipes 48 leading to the respective radiating arms 9, a sealing trough 49 containing a heavy liquid such as mercury, being provided within the header 47 so that the header and associated parts may rotate with the radiating arms without friction or wear. The upper end of the air supply conduit 46 may be provided with an annular sealing lip 50 extending down into trough 49 to maintain a seal within header 47 for the air which is supplied under pressure, the parts 46 and 50 remaining stationary. As shown in Figs. 2a and 2b the radiating arms 9 may be made up of beams 9a, 9b welded together to provide air conducting channels 9c within the arms and the suspension members 11 may be constituted by pipes which thus conduct the air down to the diffusing members 10 as shown in Fig. 2b. The struts 13 may also be made hollow and placed in communication with the channels 9c, downwardly extending pipes 14a being provided to support the diffusing members 14 and afford air connections leading thereto.

Electrical power may be fed to the motor 29 through a conduit 59 (Fig. 5) leading up through the pillar 8 to a collector ring indicated generally by numeral 60 which need not be described in detail since constructions suitable for the purpose are known. Thus current will be fed to the upper rotary structure of the apparatus and may be fed from thence to the motor by suitable connections which need be neither described nor illustrated.

Fig. 10 shows in simplified diagrammatic form the paths of travel of the sewage in passing through the apparatus. Assuming that the mixed liquor flows into the aerator through an influent channel 51 which appears in the upper left hand corner of Fig. 10, this mixed liquor will be distributed throughout the upper zone of the aerator and will pass gradually downwardly as indicated by the arrows at the left and right of Fig. 10, until it passes out at the bottom of the aerator through the aerated mixed liquor conduit 52 which leads to the clarifier. Air from the diffusion members 10 and 14 bubbles upwardly through the aerator in countercurrent relation to the downwardly flowing mixed liquor, the rotation of the air diffusion members serving to distribute the air thoroughly and uniformly to the various zones of the aerator. Thus only the most completely aerated mixed liquor will be drawn off from the aerator, and the aeration or oxidation of the liquor will increase progressively as the latter flows toward the conduit 52.

According to one aspect of the invention I prefer to conduct the aerated mixed liquor from the bottom of the aerator to the central upper portion of the clarifier which is enclosed by the curtain wall 23 above described. As shown in Figs. 1 and 10, a tube 53 communicating with the conduit 52 at its bottom and leading to the upper central portion of the clarifier, surrounds and is spaced from the central pillar 8 so as to provide one or more upwardly extending passageways 54 through which the aerated mixed liquor passes to the upper central portion of the clarifier. If desired porous air diffusing members 55 (Fig. 1) connected to the air supply conduit 46 through pipes 57, may be provided in the lower portion of the passageway 54 to assist in carrying the aerated mixed liquor up into the clarifier as well as further aerating the same, and preventing the sedimentation of suspended solids.

After reaching the upper central portion of the clarifier as above described, the aerated mixed liquor is caused by the curtain wall 23 to pass downwardly in an annular path of travel as indicated in Fig. 10, sludge particles being in the meantime progressively precipitated therein to form a part of the sludge blanket which is maintained in the bottom of the clarifier as indicated in Fig. 10. The mixed liquor passes under the curtain wall 23 and through the sludge blanket as indicated in Fig. 10, and preferably this curtain wall is so constructed and related to the clarifier, as set forth more in detail in my copending application Serial Number 75,951 filed April 23, 1936, entitled "Method and apparatus for settling and filtering sewage liquors," that the sludge blanket may serve effectively as a filtering medium for the mixed liquor. From the sludge blanket the liquor passes upwardly in the outer annular zone of the clarifier until the purified effluent passes off from the top of the clarifier. As shown in Figs. 1 and 10 an annular lip 55 may be provided at the top peripheral portion of the clarifier in such manner that the purified effluent may flow over this lip into one or more effluent conduits 56 extending downwardly in or adjacent the partition wall 4.

In the meantime the sludge will be progressively moved toward the central passageway 18, a certain amount of the sludge being usually removed from the system as indicated by the line 57 in Fig. 10, and a certain amount of the sludge being returned to mix with the incoming sewage and forming mixed liquor which passes into the aerator as indicated by the line 58 in Fig. 10.

The above apparatus, by virtue of the concentric relationship of the aerator and clarifier, occupies markedly reduced ground area as compared to independent tank installation as heretofore used, and the initial cost is also much less.

A short and direct path of travel for the sewage in passing through the apparatus is also afforded, reducing hydraulic head losses, and as above set forth the apparatus lends itself to paths of travel of the sewage through the aerator and clarifier which promote the efficiency of the aerating and settling operations. The moving operating parts needed for both the aerator and clarifier are suspended from a single overlying rotary supporting structure, in such manner that the same power unit serves for all without complicated intermediate driving connections. The various stationary parts of the apparatus, and the supply conduits, supports, etc., are so coordinated as not to obstruct or complicate the mounting and rotary movement of the moving parts. The moving parts moreover are also of a relatively compact, and well braced construction.

While the invention has been disclosed as carried out by means of a particular form of apparatus it should be understood that many changes may be made therein without departing from the invention in its broader aspects, within the scope of the appended claims.

I claim:

1. In combination, a sewage treating tank having an outer wall approximately circular in shape, an upwardly extending supporting pillar located substantially centrally with respect to said wall, an air supply conduit associated with said pillar, a mixed liquor intake conduit extending upwardly into said tank and surrounding said pillar, and an air diffusing member in the lower portion of said surrounding intake conduit, said last mentioned member being connected to said air supplying conduit.

2. A sewage treating apparatus including a tank having an outer wall approximately circular in shape, an intake conduit delivering into the central portion of said tank, a rotatably mounted supporting structure overlying said tank, an annular curtain wall suspended from said supporting structure and projecting down into said tank, said curtain wall surrounding said intake conduit and being spaced therefrom, sludge collecting members located in the lower portion of said tank and attached to said curtain wall, means to rotate said supporting structure to cause said curtain wall and sludge collecting members to rotate within the tank.

3. A sewage treating apparatus including a tank having a wall approximately circular in shape, a rotatably mounted supporting structure carried by said tank, operating members within said tank which are suspended from said structure, a power unit mounted on said supporting structure, an endless flexible chain rigidly supported in position encircling an annular part associated with said wall of said tank, and planetary gearing for connecting said power unit to said chain, said gearing including a rotary sprocket wheel carried by said supporting structure and engaging said chain, means being provided whereby said gearing is yieldingly urged into operative position with respect to said chain.

4. Sewage treatment apparatus including an aerator of approximately annular shape, a clarifier enclosed thereby, said aerator and clarifier having side walls disposed substantially symmetrically with respect to a common central axis, a mixed liquor influent conduit communicating with said aerator near the top thereof, an aerated mixed liquor conduit extending from the bottom portion of the aerator to the bottom portion of the clarifier, a purified effluent conduit extending downwardly from the top outer portion of the clarifier adjacent the wall which divides the aerator from the clarifier, a rotatably mounted supporting structure overlying said aerator and clarifier, said supporting structure being constructed and arranged to move angularly about an axis substantially concentric with the aforesaid common central axis, operating members located respectively within said clarifier and aerator, members connecting said supporting structure in driving relation to said respective operating members, and means for moving said supporting structure angularly to cause said operating members to move angularly respectively within the aerator and clarifier.

5. Sewage treatment apparatus including an aerator of approximately annular shape, a clarifier enclosed thereby, said aerator and clarifier having side walls disposed substantially symmetrically with respect to a common central axis, a mixed liquor influent conduit communicating with said aerator near the top thereof, an aerated mixed liquor conduit extending from the bottom portion of the aerator to the bottom central portion of the clarifier, said mixed liquor conduit extending upwardly to deliver into the central portion of the clarifier at a higher level, a purified effluent conduit extending downwardly from the top outer portion of the clarifier adjacent the wall which divides the aerator from the clarifier, a movably mounted supporting structure overlying said aerator and clarifier, air diffusing members located within the lower portion of said aerator, sludge collecting members located within the lower portion of said clarifier, a substantially annular curtain wall extending downwardly into said clarifier beneath the delivery level of said mixed liquor conduit, and surrounding said conduit, a rotatably mounted supporting structure overlying said aerator and clarifier, said supporting structure being constructed and arranged to rotate about an axis substantially concentric with the aforesaid common central axis, members connecting said supporting structure in driving relation to said diffusing and sludge collecting members, said curtain wall being suspended from said supporting structure, and means for moving said supporting structure angularly to cause said air diffusing members and said sludge collecting members and said curtain wall to move angularly respectively within the aerator and clarifier.

6. Sewage purification apparatus of the class described including a clarifying chamber, an aerating chamber surrounding the clarifying chamber, the side walls of said chambers being substantially symmetrically disposed about a common central axis, means for conducting aerated mixed liquor from the aerating chamber to the clarifying chamber, a supporting structure overlying both of said chambers, means mounting said supporting structure for angular movement about an axis substantially coincident with the above mentioned common central axis, movable operating members for said clarifying chamber which are attached to and angularly movable with said supporting structure and further movable operating members for said aerating chamber which are also attached to and angularly movable with said supporting structure.

7. Sewage purification apparatus of the class described including a clarifying chamber, an aerating chamber surrounding the clarifying chamber, the side walls of said chambers being substantially symmetrically disposed about a common central axis, means for conducting aerated mixed liquor from the aerating chamber to the clarifying chamber, a supporting structure overlying both of said chambers, means mounting said supporting structure for angular movement about an axis substantially coincident with the above mentioned common central axis, sludge collecting members located in the lower portion of said clarifying chamber which are attached to and angularly movable with said supporting structure, and air diffusion members located in the lower portion of said aerating chamber which are also attached to and angularly movable with said supporting structure.

8. Sewage purification apparatus of the class described including a clarifying chamber, an aerating chamber, said aerating and clarifying chambers having their side walls disposed substantially symmetrically with respect to a common central axis, means for conducting aerated liquor from the aerating chamber to the clarifying chamber, a supporting structure extending transversely with respect to and above said chambers, means mounting said structure for angular movement about an axis substantially concentric with the aforesaid common central axis, movable operating members for said clarifying chamber which are attached to and angularly movable with said supporting structure, and further movable operating members for said aerating chamber which are also attached to and angularly movable with said supporting structure.

9. Sewage purification apparatus of the class described including a clarifying chamber, an aerating chamber, said aerator and clarifying chambers having their side walls disposed substantially symmetrically with respect to a common central axis, means for conducting aerated liquor from the aerating chamber to the clarifying chamber, a supporting structure extending transversely with respect to and above said chambers, means mounting said structure for angular movement about an axis substantially concentric with the aforesaid common central axis, sludge collecting members located in the lower portion of said clarifying chamber which are attached to and angularly movable with said supporting structure, and air diffusion members located in the lower portion of said aerator which are also attached to and angularly movable with said supporting structure.

EDWARD B. MALLORY.